United States Patent
Fulton et al.

(10) Patent No.: US 6,182,444 B1
(45) Date of Patent: Feb. 6, 2001

(54) EMISSION CONTROL SYSTEM

(75) Inventors: Brien Lloyd Fulton, Farmington Hills; Katie Jo Vantine, Ypselante; Simon Goodliff, Chelsee, all of MI (US)

(73) Assignee: Ford Global Technologies, Inc., Dearborn, MI (US)

(*) Notice: Under 35 U.S.C. 154(b), the term of this patent shall be extended for 0 days.

(21) Appl. No.: 09/327,288

(22) Filed: Jun. 7, 1999

(51) Int. Cl.$^7$ ......................................................... F01N 3/00
(52) U.S. Cl. ........................ 60/277; 60/274; 60/286; 60/295; 60/301
(58) Field of Search .......................... 60/274, 277, 286, 60/295, 301

(56) References Cited

U.S. PATENT DOCUMENTS

| | | | |
|---|---|---|---|
| 3,896,616 | * 7/1975 | Keith et al. | 60/286 |
| 3,908,371 | * 9/1975 | Nagai et al. | 60/286 |
| 5,174,111 | 12/1992 | Nomura et al. | |
| 5,189,876 | 3/1993 | Hirota et al. | |
| 5,357,749 | 10/1994 | Ohsuga et al. | |
| 5,404,719 | 4/1995 | Araki et al. | |
| 5,406,790 | * 4/1995 | Hirota et al. | 60/277 |
| 5,437,153 | 8/1995 | Takeshima et al. | |
| 5,522,218 | 6/1996 | Lane et al. | |
| 5,551,231 | 9/1996 | Tanaka et al. | |
| 5,605,042 | 2/1997 | Stutzenberger | |
| 5,628,186 | 5/1997 | Schmelz | |
| 5,665,318 | 9/1997 | Rembold et al. | |
| 5,697,211 | 12/1997 | Kawaguchi | |
| 5,740,669 | 4/1998 | Kinugasa et al. | |
| 5,746,989 | 5/1998 | Murachi et al. | |
| 5,753,188 | * 5/1998 | Shimoda et al. | 60/277 |
| 5,771,686 | 6/1998 | Pischinger et al. | |
| 5,974,791 | * 11/1999 | Hirota et al. | 60/286 |

FOREIGN PATENT DOCUMENTS

0828063 A1   11/1998 (EP).

* cited by examiner

Primary Examiner—Thomas Denion
Assistant Examiner—Tu M. Nguyen
(74) Attorney, Agent, or Firm—John D. Russell; Roger L. May

(57) ABSTRACT

A reductant injection control strategy for controlling an amount of nitrogen oxide reducing agent injected upstream of a first and second serially placed nitrogen oxide catalyst, calculates the reductant injection For the first catalyst and second catalyst. The reductant injection for the first catalyst is based on engine operating conditions. The reductant injection for the second catalyst is based on the reductant injection for the first catalyst and a conversion efficiency of the first catalyst.

21 Claims, 2 Drawing Sheets

EMISSION CONTROL SYSTEM

FIELD OF THE INVENTION

The invention relates to a system and method for controlling reductant injection upstream of an active lean NOx catalyst for use with an internal combustion engine.

BACKGROUND OF THE INVENTION

In order to meet current emission regulations, active lean NOx catalyst systems with externally added reducing agents are used. In such systems, regulated emissions, such as certain nitrogen oxides, are reduced to nitrogen and water in the catalyst when a reducing agent containing hydrocarbons is added. In order to obtain maximum fuel economy while meeting emission regulations, it is necessary to inject just enough reductant to promote the chemical reactions without increasing hydrocarbon emissions by injecting too much reductant.

In certain circumstances, it may be desirable to have multiple lean NOx catalysts coupled in series to accommodate, for example, packaging and manufacturing constraints. In this case, dual reductant injection may be used for injecting reducing agent upstream of each catalyst.

One method for controlling reductant injection upstream of first and second lean NOx catalysts uses a NOx sensor located downstream of each catalyst. In this method, reductant is injected upstream of the first NOx catalyst in accordance with a control dependent on engine operating parameters. Similarly, reductant is injected upstream of the second NOx catalyst in accordance with a strategy identical to the first NOx catalyst. Both the reductant injection strategies rely on a downstream NOx sensor for the reductant control, and thereby the exhaust air/fuel ratio control. Such a system is described is U.S. Pat. No. 5,771,686.

The inventors herein have recognized a disadvantage with the above system. The above system does not indicate a method for determining the quantity of NOx entering the second catalyst. In addition, the above system does not exploit available benefits of having multiple catalyst with individual reductant injection control. In other words, the above method uses the same reductant control strategy for each catalyst, thereby requiring sensors for each catalyst. The inventors herein have recognized that improvements are possible by recognizing the physical couplings and eliminating unnecessary sensor duplications.

SUMMARY OF THE INVENTION

An object of the invention claimed herein is to provide a system and method for controlling multiple reductant injection upstream of serially placed lean NOx catalysts that maximizes nitrogen oxide conversion with minimum reductant injection.

The above object is achieved, and disadvantages of prior approaches is overcome, by the instant invention.

By realizing that the product of the first catalyst efficiency and the first reductant injection quantity is proportional to the necessary reductant injection quantity for the second catalyst, it is possible to eliminate the need for additional sensors. In other words, based on the efficiency of the first catalyst and the amount of reductant injected into the first catalyst, it is possible to calculate the amount of reductant necessary for the second catalyst. This intrinsically takes into account the amount of nitrogen oxides exiting the first catalyst, and the amount of unused reductant exiting the first catalyst, each of which will enter the second catalyst.

An advantage of the present invention is improved emission control.

Another advantage of the present invention is improved nitrogen oxide conversion efficiency.

Other objects, features and advantages of the present invention will be readily appreciated by the reader of this specification.

BRIEF DESCRIPTION OF THE DRAWINGS

The objects and advantages described herein will be more fully understood by reading an example of an embodiment in which the invention is used to advantage, referred to herein as the Description of Preferred Embodiment, with reference to the drawings, wherein.

DESCRIPTION OF PREFERRED EMBODIMENT

Figure 1:
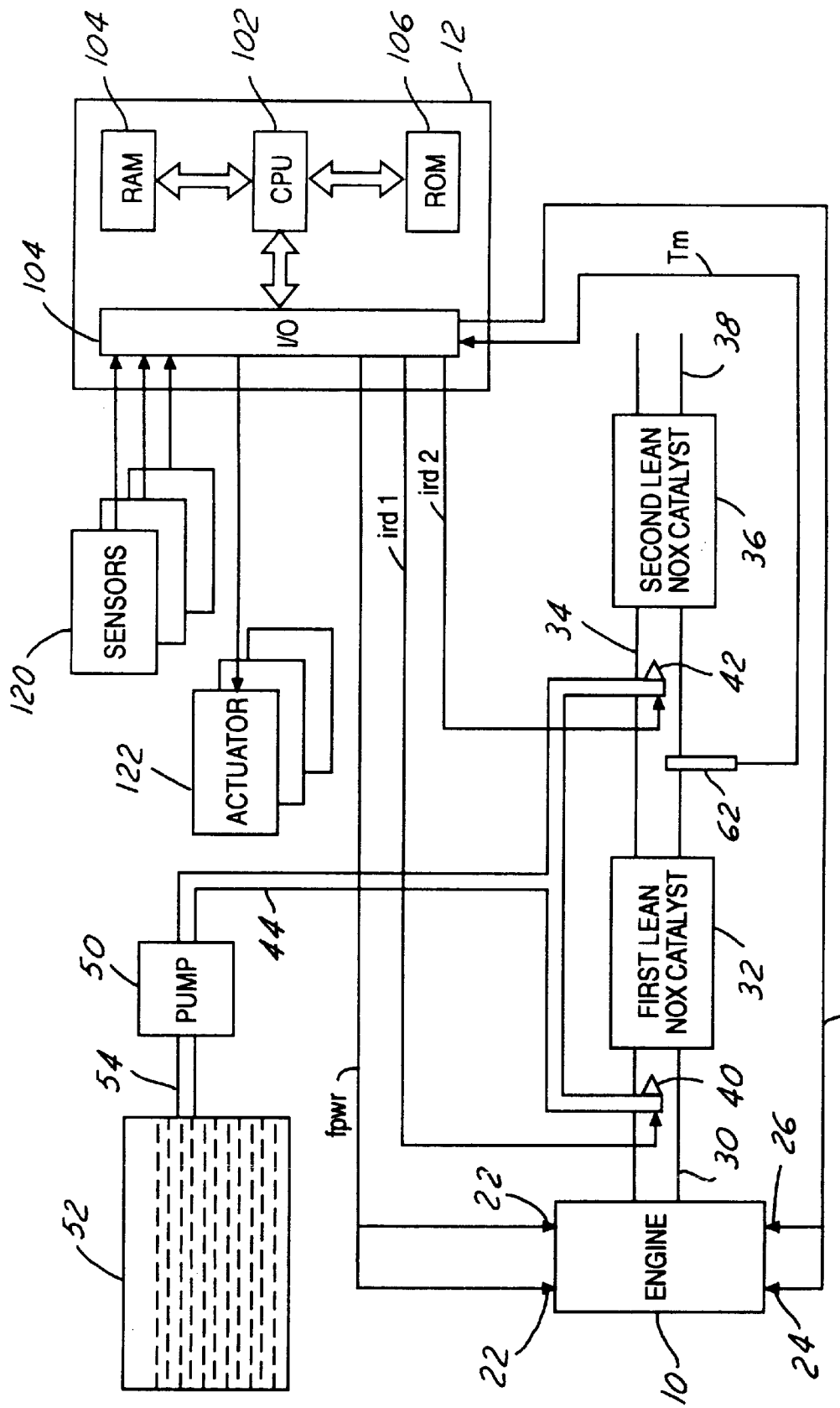
FIG. 1 is a block diagram of an embodiment wherein the invention is used to advantage.

Internal combustion engine 10, comprising a plurality of cylinders, is controlled by electronic engine controller 12 as shown in FIG. 1. Engine 10 is coupled to exhaust manifold 30, where burnt combustion gases (not shown) exit engine 10 through exhaust manifold 30. Exhaust manifold 30 is coupled to first lean NOx catalyst 32. Exhaust gases (not shown) pass through exhaust manifold 30 and then enter first catalyst 32. First catalyst 32 is coupled to second catalyst 36 via exhaust pipe 34. Exhaust gases exit first catalyst 32, pass through exhaust pipe 34, then pass through second catalyst 36, before finally passing through exit pipe 38.

Reductant is injected upstream of first catalyst 32 in exhaust manifold 30 by first reductant injector 40. Reductant is injected upstream of second catalyst 36 in exhaust pipe 34 by second reductant injector 42. First and second injectors 40 and 42 receive reductant via reductant pipe 44, which is supplied by pump 50. Pump 50 is coupled to tank 52 via second tube 54. In a preferred embodiment, reductant is diesel fuel, and tank 52 also supplies engine 10 with diesel fuel for combustion (not shown). First and second reductant injectors 40 and 42 receive signal ird1 and ird2 from controller 12 respectively.

Controller 12 is shown in FIG. 1 as a conventional microcomputer including: microprocessor unit 102, input/output ports 104, read-only memory 106, random access memory 108, and a conventional data bus. Controller 12 is shown receiving various signals from sensors 120 coupled to engine 10 and sending various signals to actuators 122. In addition, controller 12 receives an indication of exhaust temperature (Tm) from temperature sensor 62. Alternatively, temperature (Tm) may be estimated using various methods known to those skilled in the art. Controller 12 also sends signal fpwr to fuel injectors 20 and 22 and sends signal fpwl to fuel injectors 24 and 26.

As stated above, Engine 10 receives diesel fuel for combustion in a fuel injection amount represented by signal FI. The fuel injection amount is in proportion to a driver actuated element (not shown). The fuel is injected via a convention diesel fuel injection system (not shown) with a variable start of injection time according to operating conditions, where signal SOI represents the start of injection time.

Figure 2:
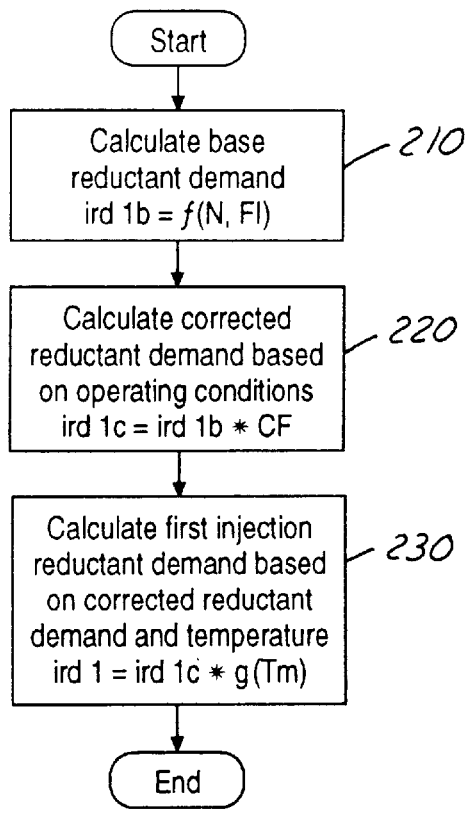
FIGS. 2–4 are high level flow charts of various operations performed by a portion of the embodiment shown in FIG. 1.

Referring now to FIG. 2, a routine for calculating signal ird1 sent to reductant injector 40 is described. First, in step 210, a base reductant demand (ird1b) is calculated from a predetermined function of engine speed (N) and fuel injection amount (FT). Then, in step 220, this base value is modified by a correction factor (CF). The correction factor is a compilation of multiple corrections for various engine operating conditions, such as, for example, exhaust gas recirculation amount, engine coolant temperature, intake air temperature, and start of injection time (SOI). For example, correction factor CF can be formed from the product of the correction for each of the engine operating conditions, with correction factor equal to 1 when the operating condition is at a base condition. In a preferred embodiment, the individual correction factors range between 0 and 2. The corrected reductant demand (ird1c) is calculated from the product of correction factor (CF) and based reductant demand (ird1b). In step 230, first injector reductant demand (ird1) is calculated based on corrected reductant demand (ird1c) and temperature (Tm)

Figure 3:
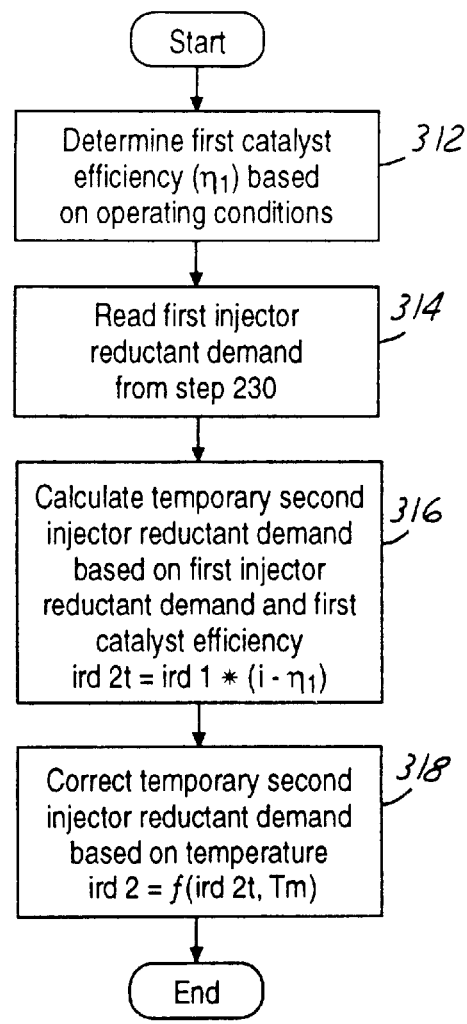

Referring now to FIG. 3, a routine for calculating signal ird2 sent to reductant injector 42 is described. First, in step 312, the efficiency (η1) of first catalyst 32 is determined based operating conditions. In a preferred embodiment, efficiency (η1) is determined from a predetermined characteristic map as a function of engine speed (N) and fuel injection amount (FI).

In step 314, the first injector reductant demand (ird1) from step 230 is read. In step 316, temporary second injector demand (ird2t) for injector 42 is calculated based on first injector reductant demand (ird1) and first catalyst efficiency (η1). More specifically, temporary second injector demand (ird2t) for injector 42 is calculated by multiplying first injector reductant (ird1) demand and unity minus first catalyst efficiency (η1). Then, in step 318, second injector reductant demand (ird2) is calculated based temporary second injector demand (ird2t) and temperature (Tm), where function f is calibrated based on engine testing data.

In this way, first and second reductant demand are calculated for controlling reductant injection into catalysts 32 and 36. By performing the calculations in this way, the reductant injection control of second catalyst 36 takes into account the operating characteristics of first catalyst 32 as well as the operating characteristics of engine 10. For example, when first catalyst 32 is operating at high efficiency and a low reductant demand, little reductant is needed for second catalyst 36. However, first catalyst 32 may be operating at high efficiency and high reductant demand, indicating larger reductant injection is needed for second catalyst 36.

In an alternative embodiment, the temperature used in steps 230 and 318 are adjusted values of temperature (Tm). In particular, when temperature sensor 62 is located between first catalyst 32 and second catalyst 36, the temperature value used in step 230 is an increased value of temperature (Tm) to account for heat loss and more accurately represent the temperature of first catalyst 32. Similarly, the temperature value used in step 318 is a decreased value of temperature (Tm) to account for heat loss and more accurately represent the temperature of second catalyst 36. The amount of increase or decrease in temperature is based on engine speed and throttle position to account for exhaust gas flow velocity.

Figure 4:
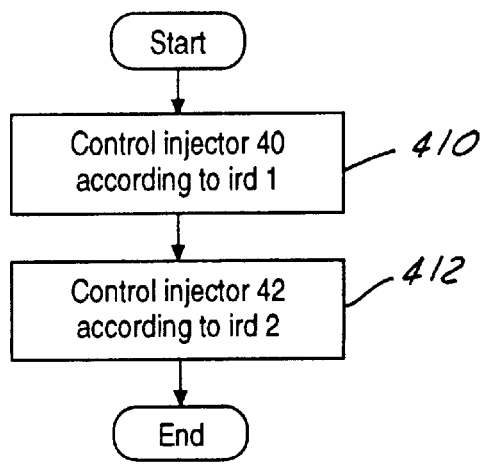

Referring to FIG. 4, a routine is described for controlling injectors 40 and 42. In step 410, injector 40 is controlled according to first injector reductant demand (ird1). Then, in step 412, injector 42 is controlled according to second injector reductant demand (ird2).

Although one example of an embodiment which practices the invention has been described herein, there are numerous other examples which could also be described. For example, the invention may be used to advantage with both lean burning diesel and gasoline engines in which nitrogen oxide emissions are produced. Also, other methods of adding reductant to the catalysts may be used. For example, reductant can be added by injecting fuel from cylinder fuel injectors during an exhaust stroke of the engine thereby allowing unburned hydrocarbons to enter the first catalyst. Also, the method is applicable to a single structure having multiple catalyst segments located therein, with reductant added between the segments. Further, the method is applicable where multiple parallel upstream catalysts lead a single underbody catalyst. For example, when the engine has multiple banks, each having a catalyst, that lead to a single underbody catalyst, the efficiency of both upstream catalysts is taken into account for adding reductant to the single underbody catalyst. The invention is therefore to be defined only in accordance with the following claims.

We claim:

1. A method for adding reductant to at least first and second catalysts serially disposed in an engine exhaust, the method comprising the steps of:

generating a first reductant quantity based on engine operating conditions representative of a nitrogen oxide quantity produced by the engine;

determining a conversion efficiency of the first catalyst based on operating conditions;

generating a second reductant quantity based on said first reductant injection quantity and said conversion efficiency;

adding reductant to the first catalyst according to said first reductant quantity; and adding reductant to the second catalyst according to said second reductant quantity.

2. The method recited in claim 1 wherein said conversion efficiency of the first catalyst is further determined based on a temperature of the first catalyst.

3. The method recited in claim 1 wherein said first reductant quantity is further based on a temperature of the first catalyst.

4. The method recited in claim 3 wherein said second reductant quantity is further based on a temperature of the second catalyst.

5. The method recited in claim 4 wherein said temperature of the first catalyst and said temperature of the second catalyst are based on a measured temperature between the first catalyst and the second catalyst.

6. The method recited in claim 5 wherein said temperature of the first catalyst is an increased value of said measured temperature and said temperature of the second catalyst is a decreased value of said measured temperature.

7. The method recited in claim 5 wherein an amount of increasing or decreasing of said increased and decreased values is based on a throttle position and an engine speed.

8. The method recited in claim 1 wherein said operating conditions are an engine speed and an engine fuel injection quantity.

9. The method recited in claim 1 wherein said first quantity is modified based on an air charge temperature entering the engine.

10. The method recited in claim 1 wherein said first quantity is modified based on an exhaust gas recirculation rate.

11. The method recited in claim 1 wherein said first quantity is modified based on a start of injection timing of fuel injected into the engine.

12. A method for controlling first and second reductant injectors coupled to first and second catalyst, with the first and second catalysts coupled to an internal combustion engine, wherein the first catalyst is located upstream of the second catalyst, the method comprising the steps of:

generating a first reductant injection quantity based on engine operating conditions representative of a nitrogen oxide quantity produced by the engine and a temperature of the first catalyst;

determining a conversion efficiency of the first catalyst based on an engine speed, said temperature of the first catalyst, and an engine fuel injection quantity;

generating a second reductant injection quantity based on said first reductant injection quantity and said conversion efficiency;

controlling the first injector according to said first reductant injection quantity; and controlling the second injector according to said second reductant injection quantity.

13. The method recited in claim 12 wherein said second reductant injection quantity is further based on a temperature of the second catalyst.

14. The method recited in claim 12 wherein said temperature of the first catalyst and said temperature of the second catalyst are based on a measured temperature between the first catalyst and the second catalyst.

15. The method recited in claim 13 wherein said temperature of the first catalyst is an increased value of said measured temperature and said temperature of the second catalyst is a decreased value of said measured temperature.

16. The method recited in claim 14 wherein an amount of increasing or decreasing of said increased and decreased values is based on a throttle position and an engine speed.

17. The method recited in claim 12 wherein said first injection quantity is modified based on an engine coolant temperature.

18. The method recited in claim 12 wherein said first injection quantity is modified based on an exhaust gas recirculation rate.

19. The method recited in claim 12 wherein said first injection quantity is modified based on a start of injection timing of fuel injected into the engine.

20. An article of manufacture comprising:

a computer storage medium having a computer program encoded therein for controlling the amount of reductant adding to first and second catalysts serially disposed in an engine exhaust, said computer storage medium comprising:

code for generating a first reductant quantity based on engine operating conditions representative of a nitrogen oxide quantity produced by the engine;

code determining a conversion efficiency of the first catalyst based on operating conditions;

code for generating a second reductant quantity based on said first reductant injection quantity and said conversion efficiency;

code for adding reductant to the first catalyst according to said first reductant quantity; and code for adding reductant to the second catalyst according to said second reductant quantity.

21. The article recited in claim 20, further comprising:

code for generating said first reductant quantity based on engine operating conditions representative of said nitrogen oxide quantity produced by the engine and a temperature of the first catalyst, wherein said first quantity is modified based on an air charge temperature entering the engine, an exhaust gas recirculation rate, and a start of injection timing of fuel injected into the engine;

code for determining said conversion efficiency of the first catalyst based on an engine speed, said temperature of the first catalyst, and an engine fuel injection quantity; and code for generating said second reductant quantity based on said first reductant quantity, said conversion efficiency, and a temperature of the second catalyst;

wherein said temperature of the first catalyst is an increased value of a measured temperature between the first catalyst and the second catalyst and said temperature of the second catalyst is a decreased value of said measured temperature between the first catalyst and the second catalyst.

* * * * *